United States Patent [19]
Lee et al.

[11] Patent Number: 5,796,700
[45] Date of Patent: Aug. 18, 1998

[54] OPTICAL PICKUP TO CIRCULARIZE LIGHT EMITTED FROM A LIGHT SOURCE

[75] Inventors: Chul-woo Lee; Pyeong-yong Seong; Dong-ho Shin, all of Seoul, Rep. of Korea

[73] Assignee: Samsung Electronics Co., Ltd., Suwon, Rep. of Korea

[21] Appl. No.: 873,740

[22] Filed: Jun. 12, 1997

[30] Foreign Application Priority Data

Jun. 15, 1996 [KR] Rep. of Korea .................. 96-21678

[51] Int. Cl.[6] ................................................ G11B 7/00
[52] U.S. Cl. .................. 369/106; 369/44.23; 369/112; 369/44.32
[58] Field of Search .................. 369/44.23, 44.32, 369/106, 112, 109, 110

[56] References Cited

U.S. PATENT DOCUMENTS

| 4,734,906 | 3/1988 | Baer et al. ........................ 363/112 |
| 5,239,414 | 8/1993 | Reno ................................. 369/112 |

FOREIGN PATENT DOCUMENTS

| 0 517 451 A1 | 12/1992 | European Pat. Off. ........ G11B 7/125 |
| 0 587 297 A2 | 3/1994 | European Pat. Off. ........ G11B 7/135 |
| 8-115524 | 5/1996 | Japan . |
| 8-249669 | 9/1996 | Japan . |

Primary Examiner—Tod R. Swann
Assistant Examiner—Kim-Kwok Chu
Attorney, Agent, or Firm—Staas & Halsey

[57] ABSTRACT

An optical pickup having a beam shaping device for changing an oval-shaped light beam emitted from a light source into a circular light beam, and an astigmatic difference correcting device for correcting the astigmatic difference of the light is provided. The beam shaping device is a cylindrical lens arranged between the light source and a beam splitter, having a convex cross-section, for converging the incident light, e.g., with respect to an X-axial direction. The astigmatic difference correcting device is an astigmatism lens arranged along an optical path between the cylindrical lens and a light path changing device, as a concave lens, for linearly passing light of a certain direction and diverging light of other directions.

15 Claims, 13 Drawing Sheets

OPTICAL PICKUP TO CIRCULARIZE LIGHT EMITTED FROM A LIGHT SOURCE

BACKGROUND OF THE INVENTION

1. Field of the Invention

The present invention relates to an optical pickup, and more particularly, to an optical pickup for circularizing light emitted from a light source and correcting astigmatic differences of the light.

2. Description of the Related Art

Figure 1:
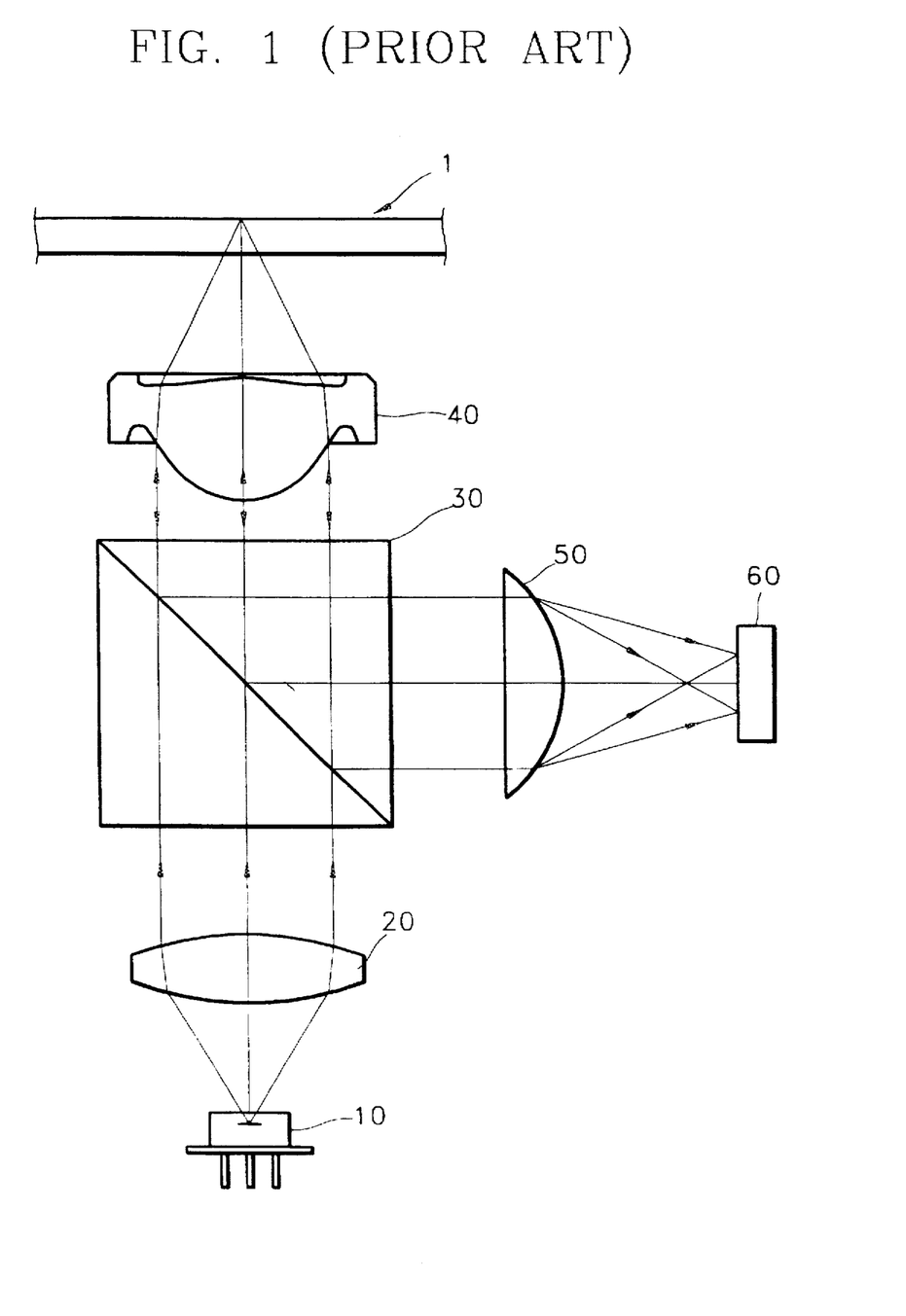
FIG. 1 is a diagram showing an optical arrangement of a conventional optical pickup.

Generally, an optical pickup used for recording and/or reproducing information on and/or from a recording medium using a laser beam includes, as shown in FIG. 1, a light source 10 for generating and emitting a laser beam, a collimating lens 20 for collimating the light emitted from the light source 10, a light path changing unit 30 for selectively changing a traveling path of an incident light, an objective lens 40 for converging the light to form a light spot on a recording surface of a recording medium 1, and a photodetector 60 for detecting an information signal and an error signal from the light reflected from the recording medium 1. Also, the optical pickup may further include a sensing lens 50 installed along the optical path between the light path changing unit 30 and the photodetector 60, to enable detection of a focus error signal by an astigmatism method. Here, a small and light edge emitting laser diode is adopted as the light source 10.

Figure 2:
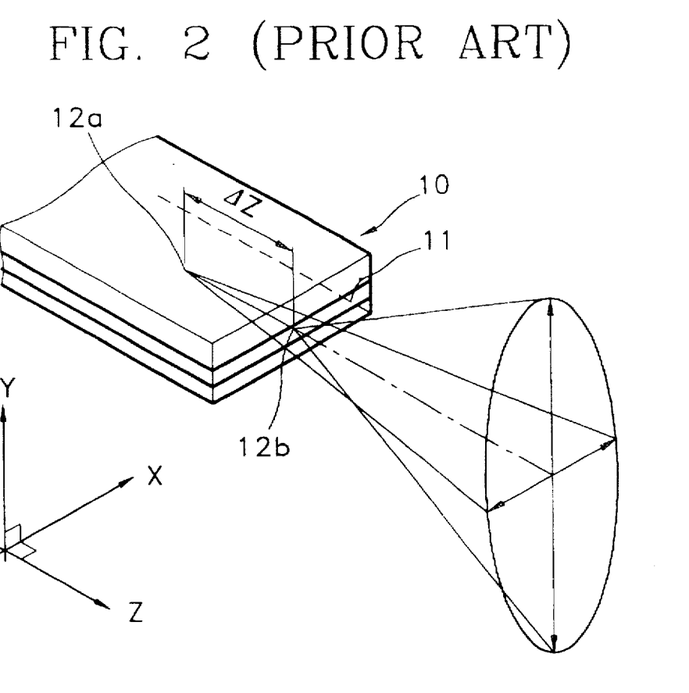
FIG. 2 is a perspective view showing an edge emitting laser diode adopted as the light source shown in FIG. 1.

However, as shown in FIG. 2, the edge emitting laser diode emits an oval-shaped beam from an active layer 11 thereof. This is due to the difference in source points 12a and 12b of the laser beam, wherein the distance ($\Delta Z$) between the source points 12a and 12b is defined as the "astigmatic difference".

Since the laser beam has an oval shape, loss of light occurs after passing through the circular objective lens 40, lowering light efficiency. Thus, it is necessary to circularize the light beam and correct the astigmatic difference of the light for enhancing light efficiency in the optical pickup.

Figure 3A:
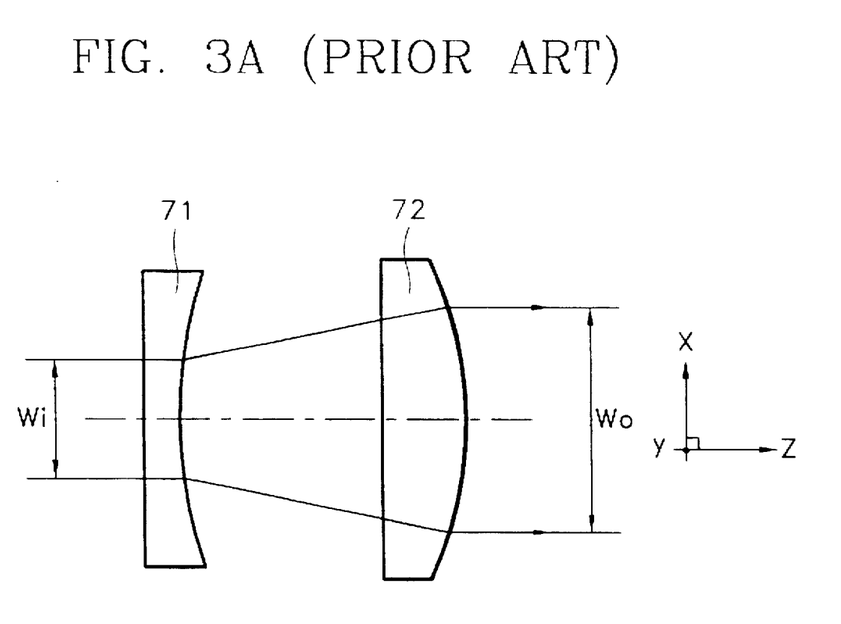
FIGS. 3A and 3B are diagrams showing first and second cylindrical lenses adopted in the conventional optical pickup for correcting the astigmatic difference of a laser beam, viewed along the Y- and X-axis, respectively.
Figure 3B:
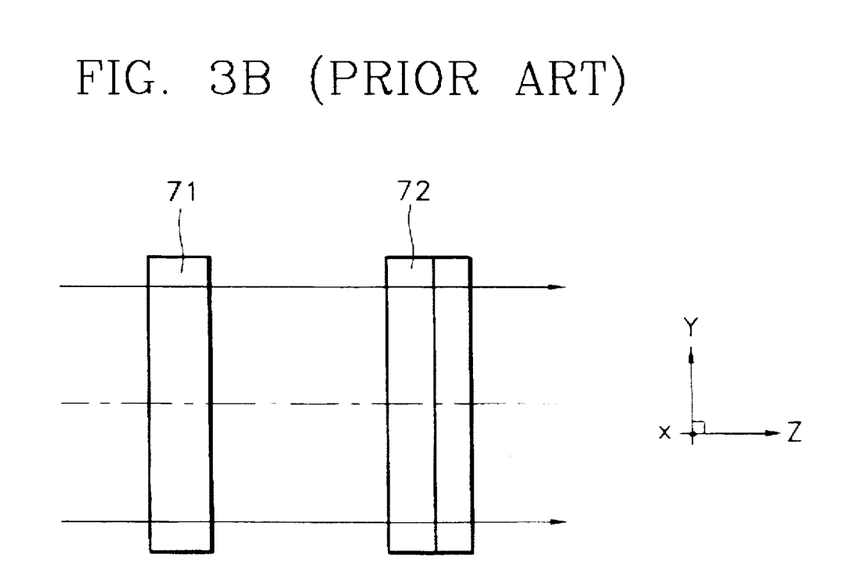

A conventional optical pickup for correcting the astigmatic difference of the laser beam adopts, as shown in FIGS. 3A and 3B, first and second cylindrical lenses 71 and 72 having different focal distances along the light path between the collimating lens 20 and the light path changing unit 30 shown in FIG. 1. Here, FIG. 3A is a diagram showing the first and second cylindrical lenses 71 and 72 viewed from the top of the active layer 11 (see FIG. 2), that is, along the Y-axis, and FIG. 3B is a diagram showing the first and second cylindrical lenses 71 and 72 viewed from the side of the active layer 11, that is, along the X-axis.

Assuming that a focal distance of the first cylindrical lens 71 along the X-axis is f1 and that of the second cylindrical lens 72 is f2, the diameter $W_o$ of the light exiting the second cylindrical lens 72 is defined by the following equation:

$$W_o = \frac{f_2}{f_1} W_i$$

wherein $W_i$ is the diameter of the light entering the first cylindrical lens 71.

Accordingly, the diameter of the beam along the X-axis can be matched to that of the beam along the Y-axis through adjustment by the first and second cylindrical lenses 71 and 72.

However, in the method for correcting the astigmatic difference by adopting cylindrical lenses, there are difficul-

2 ties in the manufacturing of a lens having excellent wavefront aberration and proper adjustment of the optical axis. Also, since a space for installing the cylindrical lenses between the collimating lens and the objective lens is required, miniaturization of the optical pickup is limited.

Figure 4:
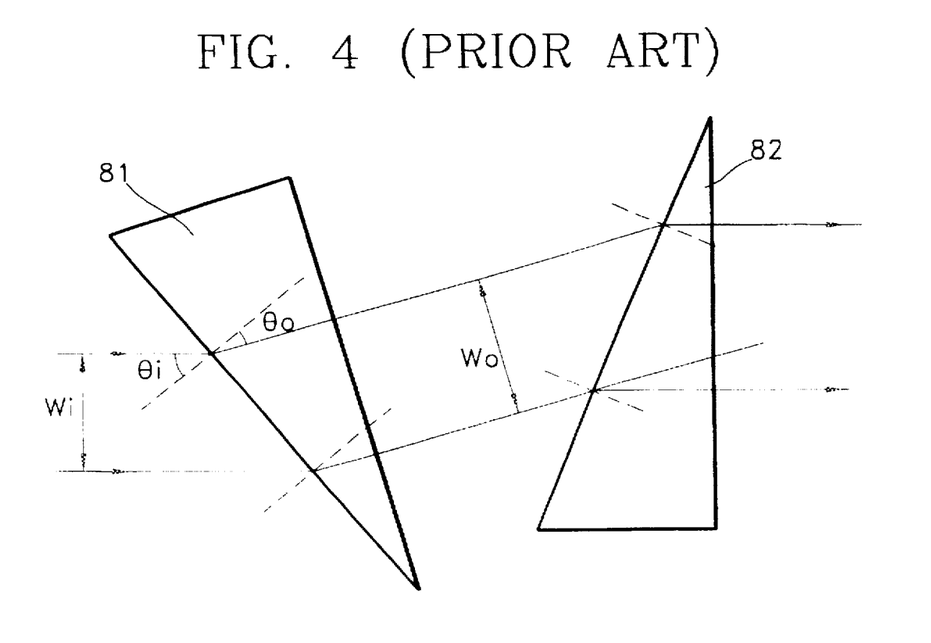
FIG. 4 is a schematic view of first and second prisms adopted in the conventional optical pickup for correcting the astigmatic difference of a laser beam.

Another conventional optical pickup for correcting the astigmatic difference further includes first and second prisms 81 and 82, as shown in FIG. 4, between the collimating lens 20 and the light path changing unit 30 shown in FIG. 1. Assuming that the angle of light incident on the first prism 81 is $\theta_i$ and the angle exiting therefrom is $\theta_o$, the diameter $W_o$ of the light exiting the first prism 81 is defined as follows:

$$W_o = \frac{\cos\theta_o}{\cos\theta_i} W_i$$

wherein $W_i$ is the diameter of the light entering the first prism 81.

Accordingly, the astigmatic difference of the light emitted from the light source can be corrected. The second prism 82 corrects the direction of the optical axis bent by the first prism 81 back to the original direction.

However, the optical pickup including the collimating lens 20 and two prisms 81 and 82 between the light source 10 and the light path changing unit 30 also severely limits the miniaturization thereof. Also, tilting or shifting of the optical path may occur.

SUMMARY OF THE INVENTION

To solve the above problems, it is an object of the present invention to provide an optical pickup for circularizing a laser beam and correcting the astigmatic difference of the light, and simultaneously enabling miniaturizing of products.

According to an aspect of the present invention, an optical pickup includes a beam shaping unit for changing an oval-shaped light beam emitted from a light source into a circular light beam, and an astigmatic difference correcting unit for correcting the astigmatic difference of the light. The path along which the laser beam emitted from the light source of the optical pickup travels is changed by a light path changing unit and then collimated by a collimating lens. Then, the collimated light is converged on a recording medium by an objective lens installed between the light path changing unit and the recording medium. The light reflected from the recording medium is received by a photodetector to detect information and error signals. Also, the beam shaping unit is arranged along an optical path between the light source and the collimating lens, for changing the oval-shaped light emitted from the light source into a circular light beam. Here, preferably, the beam shaping unit is a cylindrical lens. Also, the cylindrical lens may be integrally formed with the collimating lens.

According to another aspect of the present invention, the beam shaping unit is a prism arranged along an optical path between the light source and the light path changing unit, having a light receiving surface formed at an angle to refract the incident light from the light source, and a light exiting surface formed at a right angle with respect to the optical axis. In this case, preferably, the optical pickup further includes an auxiliary prism arranged between the prism and the light source, for making the optical axis of the light passing through the prism to be parallel to the optical axis of the light emitted from the light source.

In the present invention, the astigmatic difference correcting unit is arranged along an optical path between the beam shaping unit and the collimating lens. Here, preferably, the astigmatic difference correcting unit is an astigmatism lens. Also, preferably, the astigmatism lens is a concave lens for linearly passing light of a certain direction, from the cylindrical lens, and diverging light of other directions.

Accordingly, the optical pickup of the present invention enhances light efficiency by circularizing a laser beam and correcting the astigmatic difference thereof.

BRIEF DESCRIPTION OF THE DRAWINGS

The above object and advantages of the present invention will become more apparent by describing in detail preferred embodiments thereof with reference to the attached drawings in which.

DETAILED DESCRIPTION OF THE INVENTION

Figure 5:
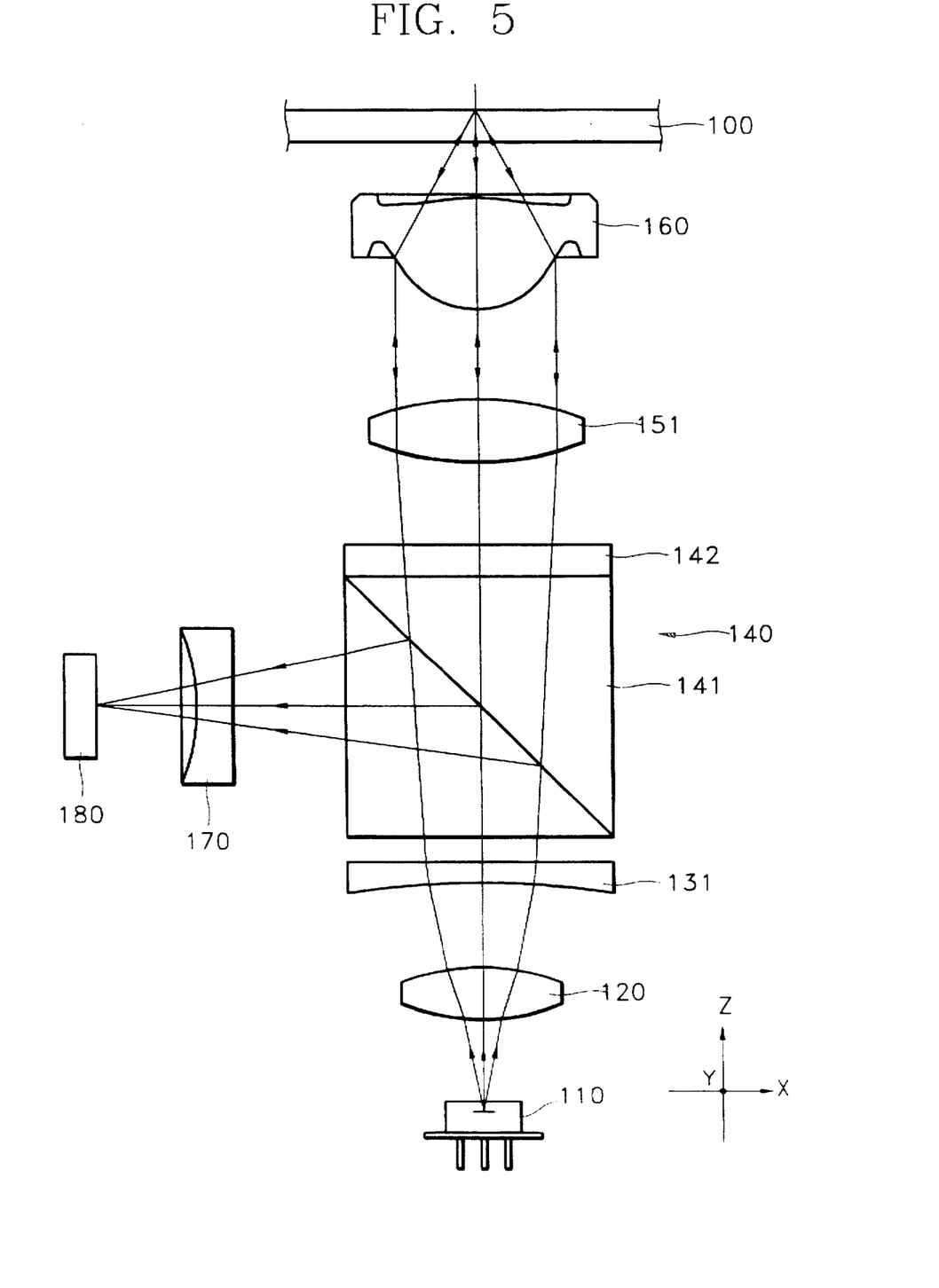
FIGS. 5 and 6 are diagrams showing the optical arrangement of an optical pickup according to a first embodiment of the present invention, viewed along the Y- and X-axis, respectively.
Figure 6:
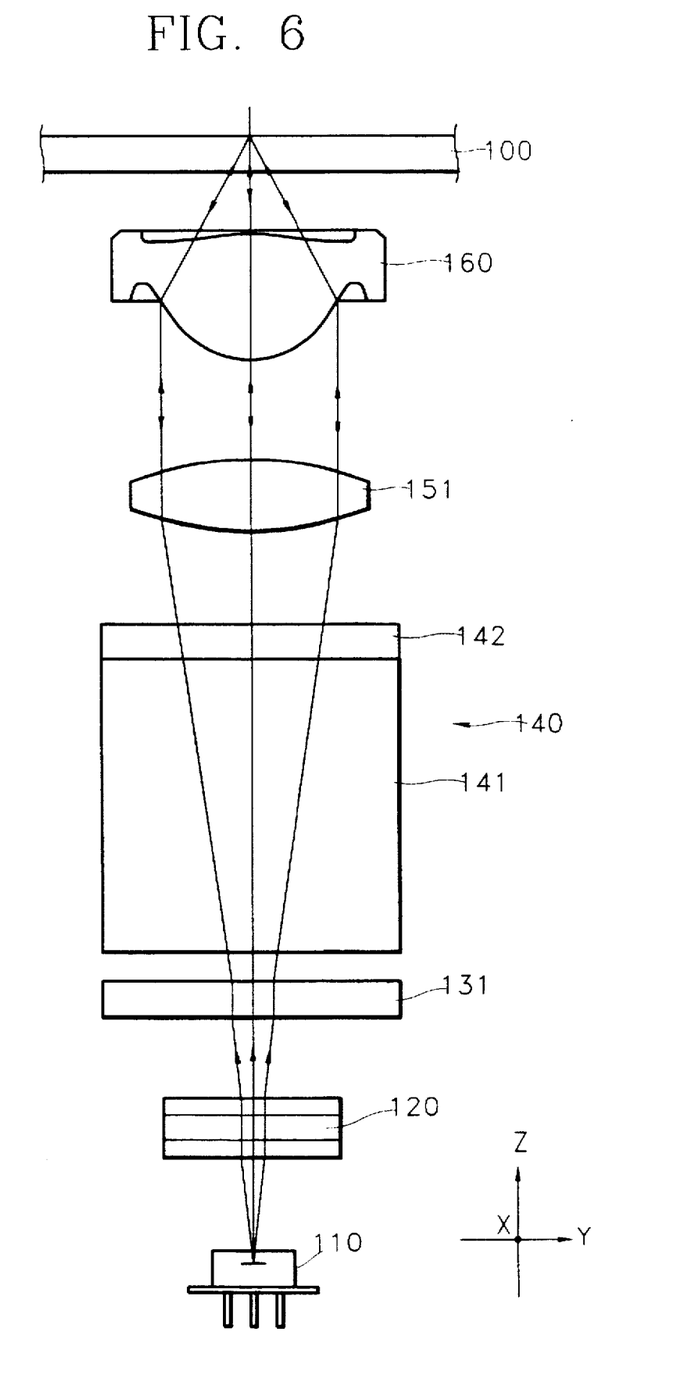

As shown in FIGS. 5 and 6, an optical pickup according to a first embodiment of the present invention includes a light source 110, a light path changing unit 140 for changing a path along which the light travels, an objective lens 160 for converging the incident light to form a light spot on a recording surface of a recording medium 100, a collimating lens 151 for collimating the light to be entered into the recording medium 100, a photodetector 180 for receiving the light via the light path changing unit 140 after having been reflected off of the recording medium 100, a cylindrical lens 120 as a beam-shaping unit for changing an oval-shaped light beam emitted from the light source 110 into a circular light beam, and an astigmatic difference correcting unit, i.e., astigmatism lens 131, for correcting the astigmatic difference of the circularized beam.

As shown in FIG. 2, the light source 110 is an edge emitting laser diode. The light path changing unit 140 is arranged along the light path between the light source 110 and the objective lens 160, and guides the light emitted from the light source 110 toward the recording medium 100 and the light reflected from the recording medium 100 toward the photodetector 180.

Also, the light path changing unit 140 includes a polarization beam splitter 141 for selectively transmitting or reflecting the incident light according to a polarized light component, and a retardation plate 142 for retarding the phase of the incident light. The polarization beam splitter 141 transmits light of a certain polarization and reflects the light of other polarizations. Preferably, the retardation plate 142 is a λ/4 wave length plate for delaying the phase of the incident light by 90°. Thus, when the light emitted from the light source 110 coincides with the polarization direction of the polarization beam splitter 141, the light emitted from the light source 110 reaches the photodetector 180 via the polarization beam splitter 141, the objective lens 160 and the recording medium 100 without light loss.

Also, a beam splitter for transmitting and reflecting the incident light by dividing the incident light according to a predetermined light amount ratio may be adopted as the light path changing unit 140.

The collimating lens 151 is arranged between the light path changing unit 140 and the objective lens 160 and collimates the light from the light source 110.

The cylindrical lens 120 is an unilateral convex lens which has a convex cross-section when viewed along the Y-axis as shown in FIG. 5 and a rectangular cross-section when viewed along the X-axis as shown in FIG. 6. Thus, the light emitted from the light source 110 converges with respect to the X-axis while passing through the cylindrical lens 120, and passes without change with respect to the Y-axis. Thus, the oval-shaped light beam emitted from the light source 110 is corrected to a circular light beam while passing through the cylindrical lens 121. However, since the focal positions of the circular light with respect to the X- and Y-axis are different, astigmatism exists in the circular light passed through the cylindrical lens 121 when the light is conversed on the recording medium 100 like the oval-shaped beam as before. This can be corrected by an astigmatic difference correction unit such as the astigmatism lens 131 arranged along the optical path between the cylindrical lens 120 and the light path changing unit 140. The astigmatism lens 131 is an unilateral concave lens which has a concave cross-section when viewed along the Y-axis as shown in FIG. 5 to diverge the incident light with respect to the X-axis and a rectangular cross-section when viewed along the X-axis as shown in FIG. 6 to pass the incident light linearly with respect to the Y-axis.

To detect a focusing error signal by the photodetector 180 using the astigmatism method, it is preferable to further comprise a sensing lens 170 between the light path changing unit 140 and the photodetector 180.

The photodetector 180 is formed of a plurality of divided plates each of which independently receives the light and changes the received light into an electrical signal. A detailed description of the photodetector 180 is omitted.

Figure 7:
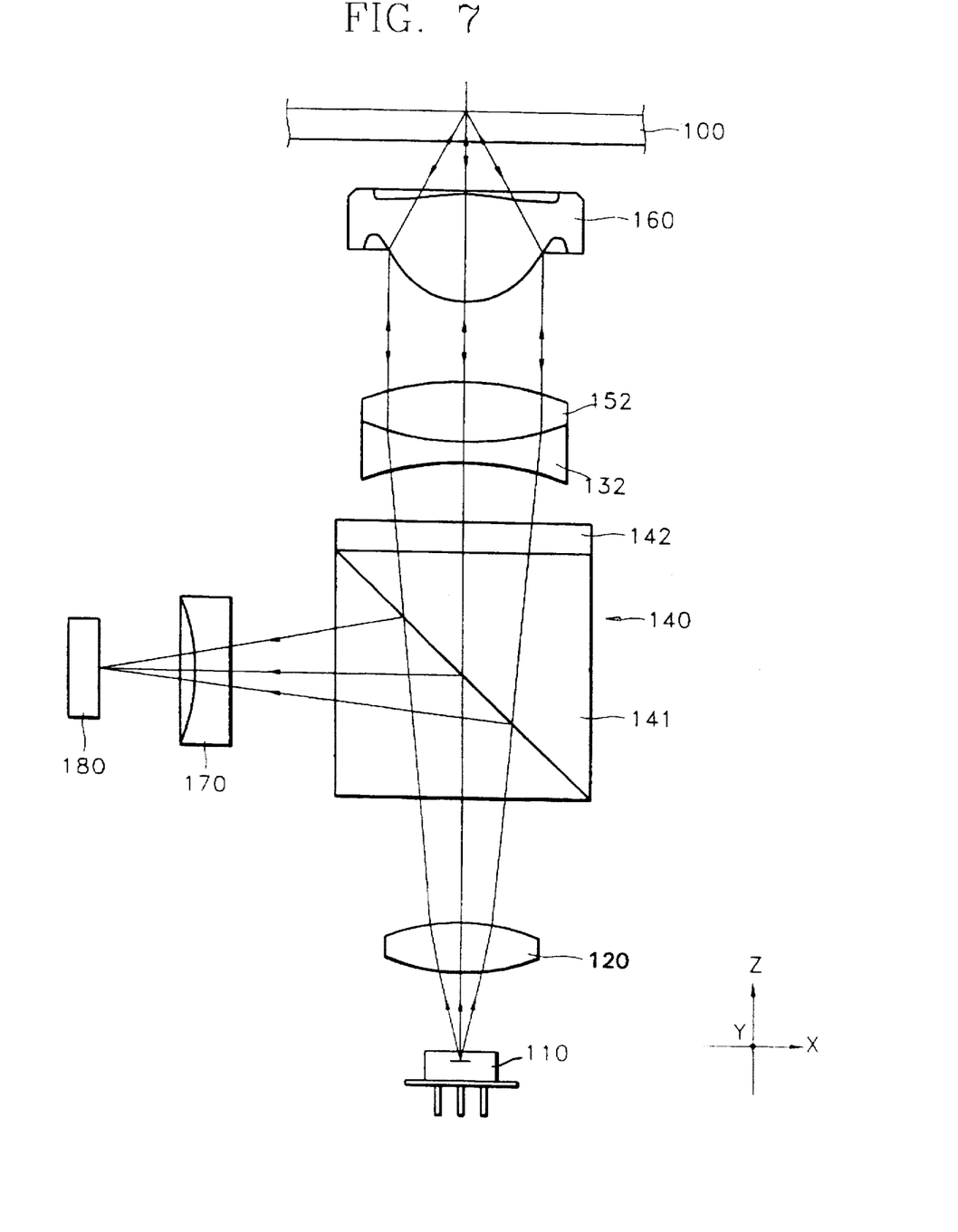
FIGS. 7 and 8 are diagrams showing the optical arrangement of an optical pickup according to a second embodiment of the present invention, viewed along the Y- and X-axis, respectively.
Figure 8:
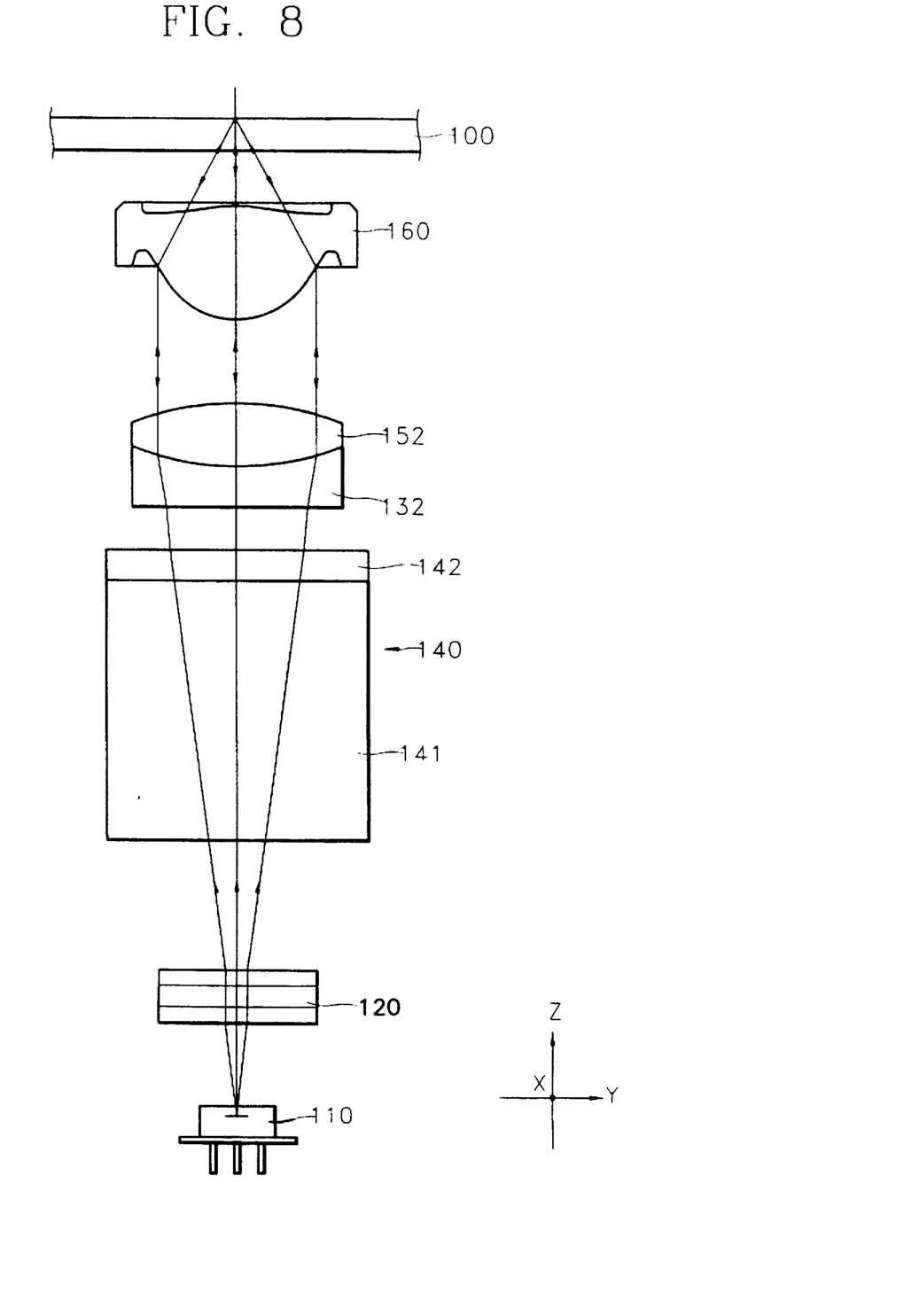

FIGS. 7 and 8 show an optical arrangement of an optical pickup according to a second embodiment of the present invention. Here, the same reference numerals as those of FIGS. 5 and 6 represent the same optical elements.

In the optical pickup of FIGS. 7 and 8, an astigmatism lens 132 and a collimating lens 152 are integrally formed. Thus, the optical pickup can easily be miniaturized by reducing the number of optical elements. An incident surface of the astigmatism lens 132 is concave when viewed along the Y-axis as shown in FIG. 7 to diverge the light with respect to the X-axis and is flat when viewed along the X-axis as shown in FIG. 8 to pass light linearly with respect to the Y-axis.

Figure 9:
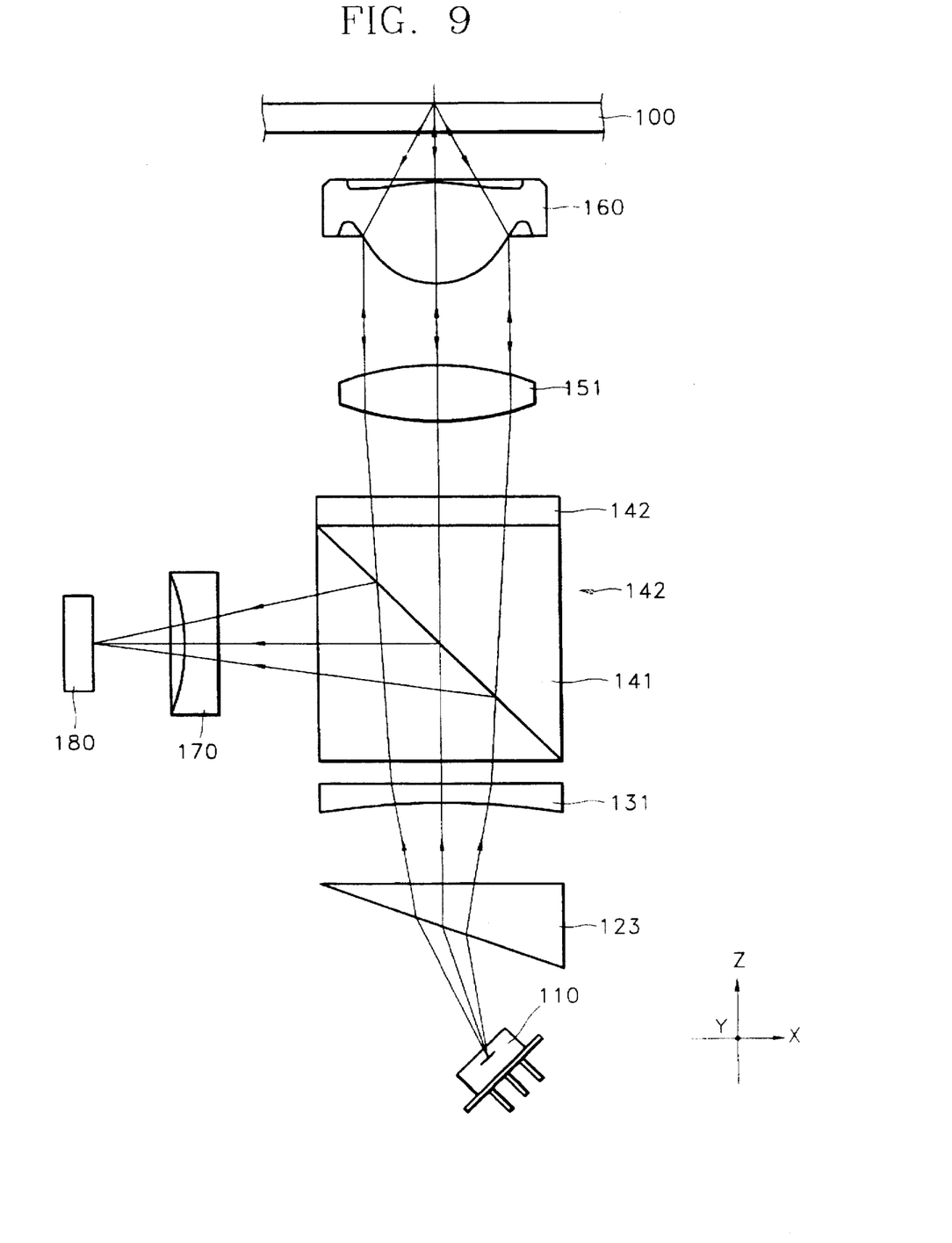
FIGS. 9 and 10 are diagrams showing the optical arrangement of an optical pickup according to a third embodiment of the present invention, viewed along the Y- and X-axis, respectively.
Figure 10:
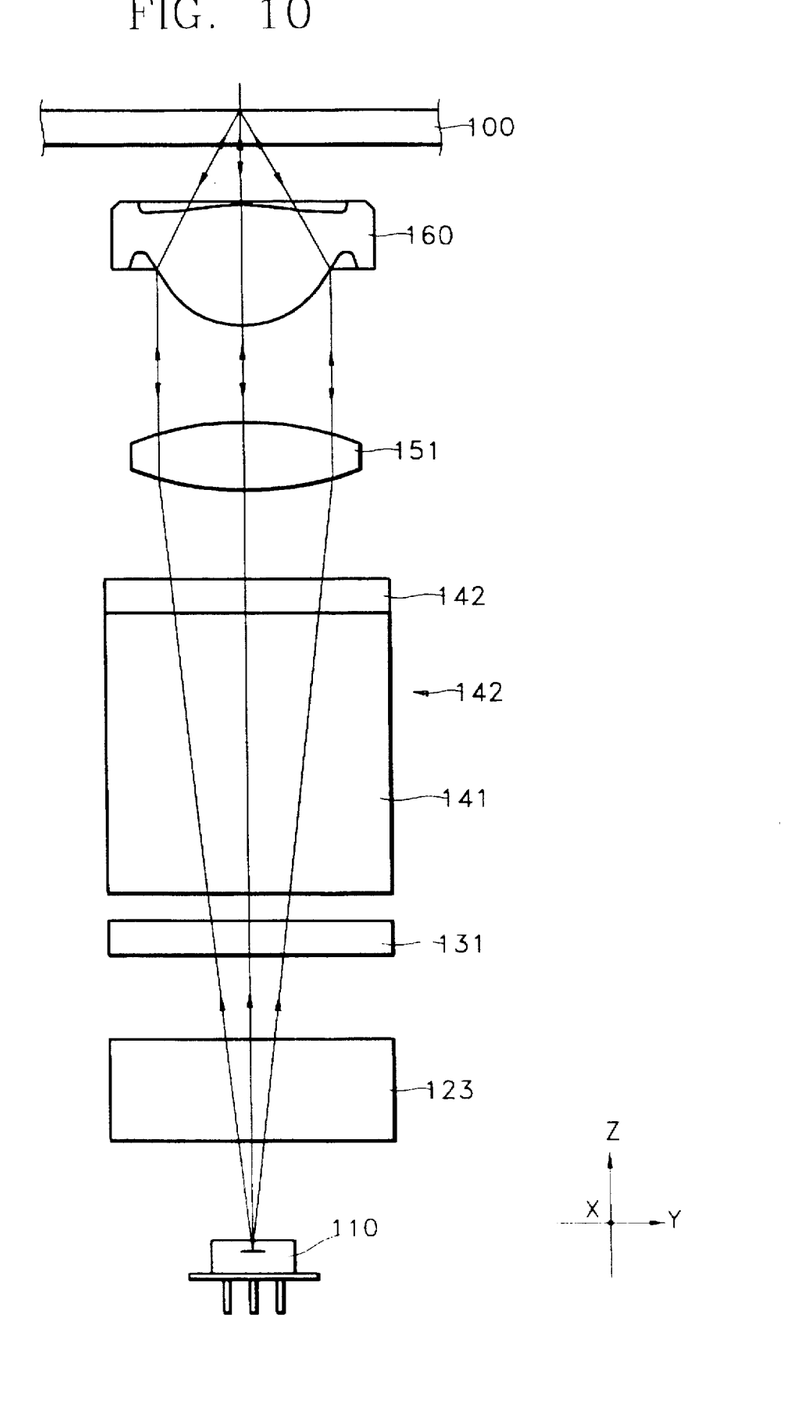

FIGS. 9 and 10 show an optical arrangement of an optical pickup according to a third embodiment of the present invention. Here, the same reference numerals as those of the above embodiments represent the same optical elements.

The optical pickup of FIGS. 9 and 10 adopts a prism 123 as a beam shaping unit. The prism 123 is arranged along an optical path between the light source 110 and the light path changing unit 140, having a light receiving surface which is arranged at an angle with respect to the light source 110 to refract the light from the light source 110, and a light exiting surface which is arranged at a right angle with respect to an optical axis to change the incident oval light beam into a circular light beam. That is, the prism 123 has a triangular cross-section when viewed along the Y-axis as shown in FIG. 9 to change the shape of the incident light in the X-axis, with the slanted side on the side of the light source 110, and a rectangular cross-section when viewed along the X-axis as shown in FIG. 10 to linearly pass incident light in the Y-axis.

Figure 11:
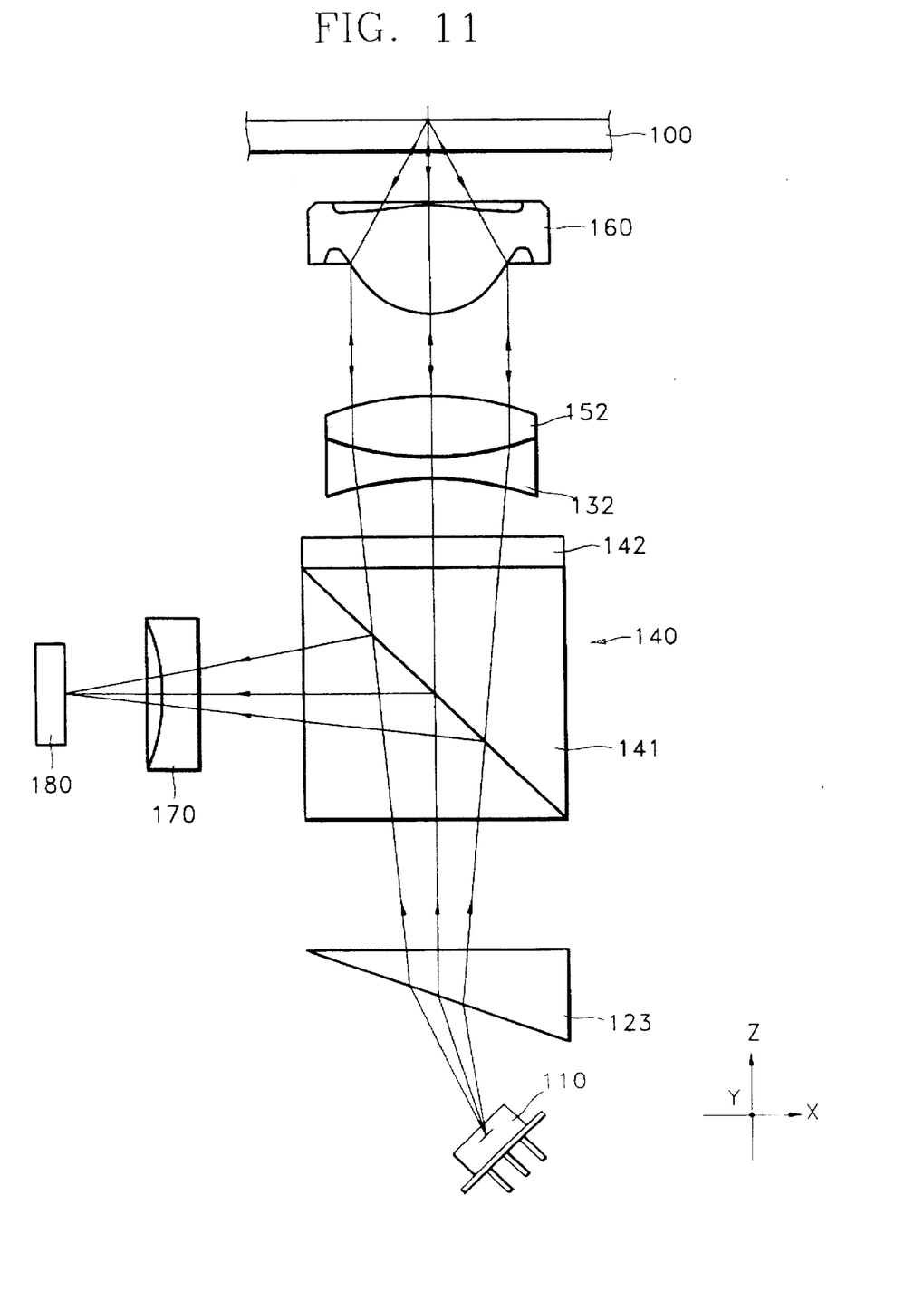
FIGS. 11 and 12 are diagrams showing the optical arrangement of an optical pickup according to a fourth embodiment of the present invention, viewed along the Y- and X-axis, respectively.
Figure 12:
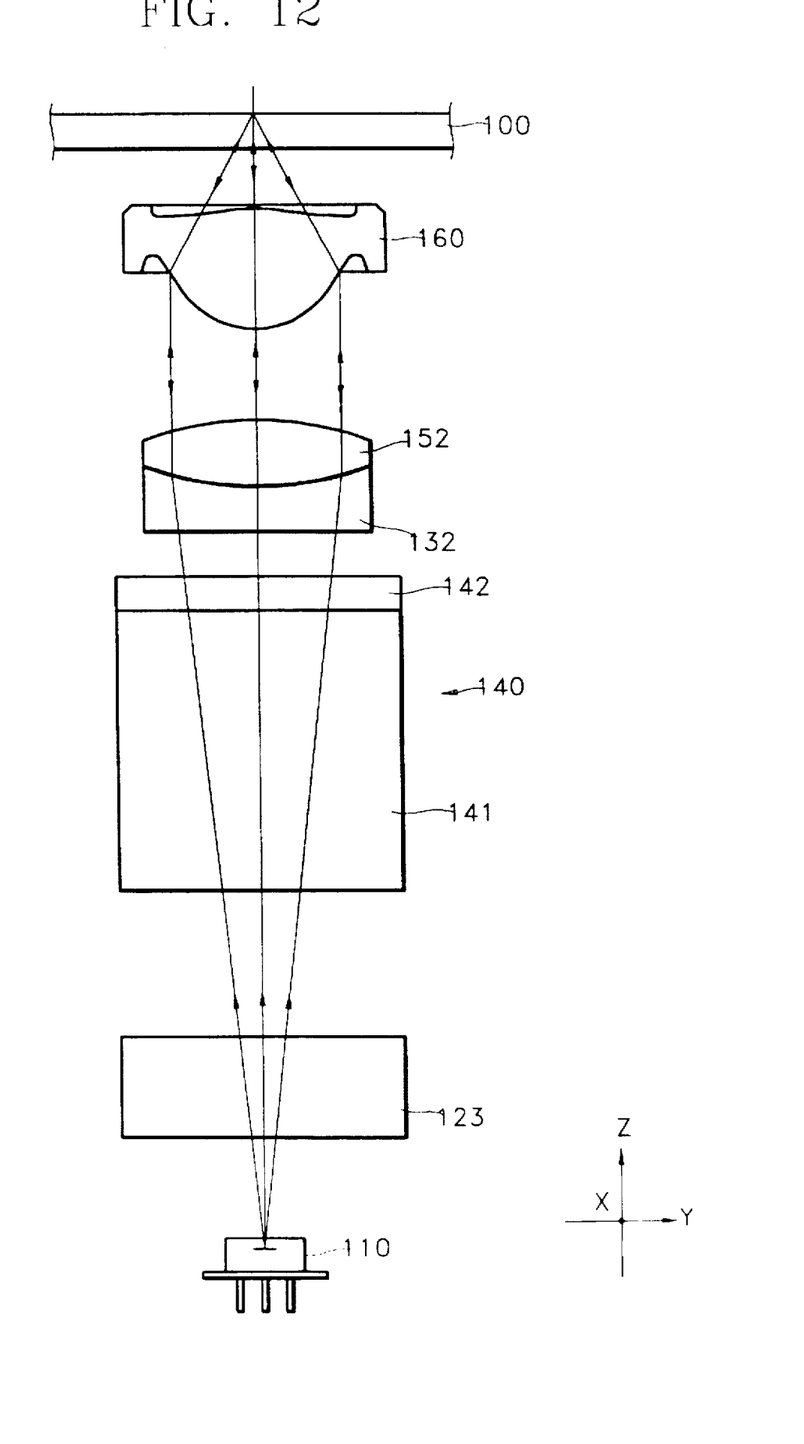

FIGS. 11 and 12 show an optical arrangement of an optical pickup according to a fourth embodiment of the present invention. Here, the same reference numerals as those of the above embodiments represent the same optical elements.

In the optical pickup of FIGS. 11 and 12, the astigmatism lens 132 and the collimating lens 152 are integrally formed, as in FIGS. 7 and 8.

Also, the prism 123 as in FIGS. 9 and 10 is arranged between the light source 110 and the light path changing means 140.

Figure 13:
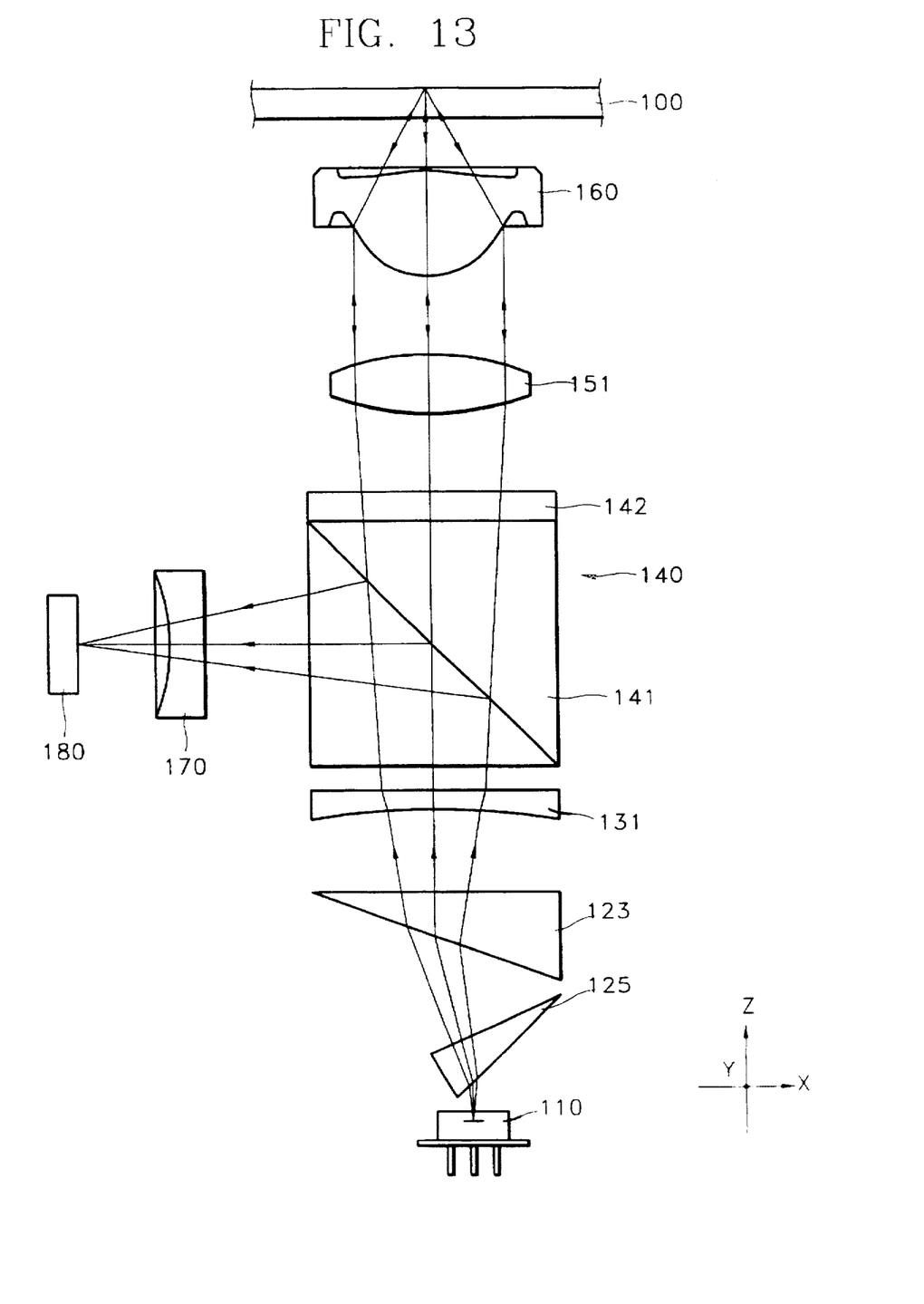
FIGS. 13 and 14 are diagrams showing the optical arrangement of an optical pickup according to a fifth embodiment of the present invention, viewed along the Y- and X-axis, respectively.
Figure 14:
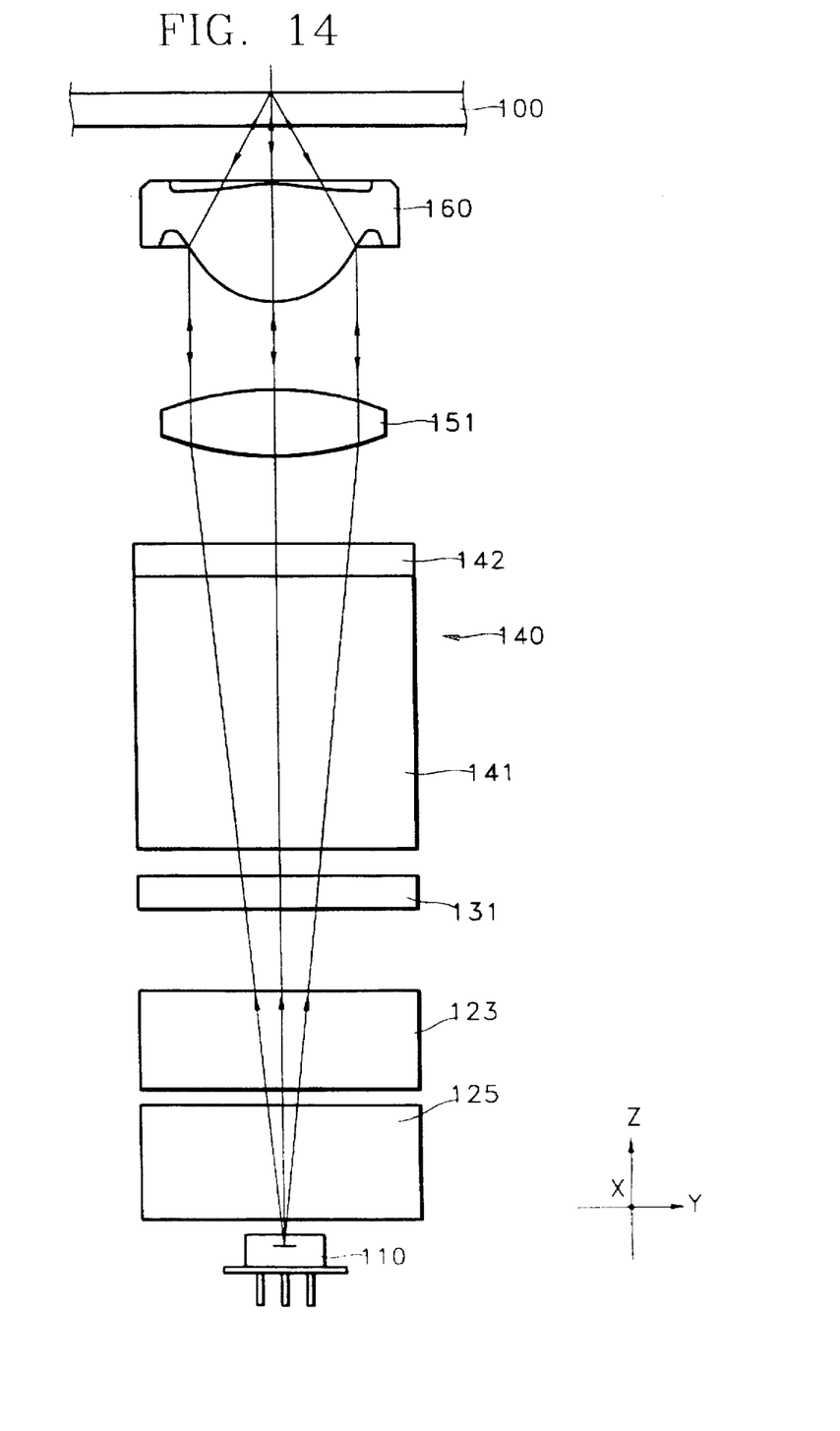

FIGS. 13 and 14 show an optical arrangement of an optical pickup according to a fifth embodiment of the present invention. Here, the same reference numerals as those of the above embodiments represent the same optical elements.

The optical pickup of FIGS. 13 and 14 further include an auxiliary prism 125 between the light source 110 and the prism 123. The auxiliary prism 125 makes the optical axis of the light emitted from the light source 110 parallel to that of the light going toward the recording medium 100 after passing through the prism 123. The auxiliary prism 125 has a light receiving surface arranged at an angle with respect to the light source 110 and a light exiting surface arranged at a right angle with respect to the optical axis of the light passed through the auxiliary prism 125.

As described above, the optical pickup can achieve circularization of a light beam and correction of the astigmatic difference thereof, so that efficiency of light emitted from the light source 110 can be enhanced. Also, the collimating lens which is generally arranged between the light source and the light path changing unit is arranged between the light path changing unit and the objective lens, so that an optimal optical arrangement can be achieved, minimizing the size of the optical pickup and simultaneously providing easy assembling thereof.

What is claimed is:

1. An optical pickup to read from and/or record to a recording medium, comprising:

a light source to emit a light beam;

light path changing means arranged along an optical path of the light, for changing a path along which the light travels;

an objective lens arranged along the optical path between said light path changing means and the recording medium, to converge the light to form a light spot on the recording medium;

a collimating lens arranged along the optical path between said light path changing means and said objective lens, to collimate the light going toward the recording medium;

a cylindrical lens arranged along the optical path between said light source and said collimating lens, to change the light, having an oval shape, into a light having a circular shape;

astigmatic difference correcting means arranged along the optical path between said cylindrical lens and said collimating lens, for correcting an astigmatic difference of the light; and a photodetector for detecting information and error signals by receiving the light from said light source and reflected from the recording medium.

2. An optical pickup as claimed in claim 1, wherein said astigmatic difference correcting means is an astigmatism lens.

3. An optical pickup as claimed in claim 2, wherein said astigmatism lens is an unilateral concave lens for linearly passing light of a certain direction passed through said cylindrical lens and diverging light of other directions.

4. An optical pickup as claimed in claim 3, wherein said astigmatism lens is integrally formed with said collimating lens.

5. An optical pickup as claimed in claim 1, wherein said light path changing means comprises:

a polarization beam splitter to transmit light of a certain polarization and reflect light of other polarizations; and a retardation plate arranged along the optical path between said polarization beam splitter and said objective lens, to delay a phase of the light incident thereupon.

6. An optical pickup as claimed in claim 5, wherein said retardation plate is a λ/4 wave length plate to delay the phase of the incident light by 90°.

7. An optical pickup as claimed in claim 1, further comprising:

a sensing lens arranged along the optical path between said light path changing means and said photodetector, to enable detection of a focus error signal by an astigmatism method.

8. An optical pickup to read from and/or record to a recording medium, comprising:

a light source to emit a light beam;

light path changing means arranged along an optical path of the light, to change the path along which the light travels;

an objective lens arranged along the optical path between said light path changing means and the recording medium, to converge the light to form a light spot on the recording medium;

a collimating lens arranged along the optical path between said light path changing means and said objective lens, to collimate the light going toward the recording medium;

a prism arranged along the optical path between said light source and said light path changing means, having a light receiving surface formed at an angle with respect to an optical axis of the light emitted from said light source to refract the light from said light source and a light exiting surface arranged at a right angle with respect to the optical axis;

astigmatic difference correcting means arranged along the optical path between said prism and said collimating lens, for correcting an astigmatic difference of the light; and a photodetector to detect information and error signals by receiving the light from said light source and reflected from the recording medium.

9. An optical pickup as claimed in claim 8, further comprising:

an auxiliary prism arranged between said prism and said light source, to make another optical axis of the light passed through said prism parallel to the optical axis of the light emitted from said light source.

10. An optical pickup as claimed in claim 9, wherein said astigmatic difference correcting means is an astigmatism lens.

11. An optical pickup as claimed in claim 10, wherein said astigmatism lens is an unilateral concave lens for linearly passing the light of a direction passed through said cylindrical lens and diverging the light of another direction passed through said cylindrical lens.

12. An optical pickup as claimed in claim 11, wherein said astigmatism lens is integrally formed with said collimating lens.

13. An optical pickup as claimed in claim 8, wherein said light path changing means comprises:

a polarization beam splitter to transmit light of a polarization direction and reflect light of the remaining polarization direction; and a retardation plate arranged in the optical path between said polarization beam splitter and said objective lens, to delay a phase of the light entering thereto.

14. An optical pickup as claimed in claim 13, wherein said retardation plate is a λ/4 wavelength plate to retard the phase of the incident light by 90°.

15. An optical pickup as claimed in claim 8, further comprising:

a sensing lens arranged along the optical path between said light path changing means and said photodetector, to enable detection of a focusing error signal by an astigmatism method.

* * * * *